(12) United States Patent
Hiremath et al.

(10) Patent No.: US 9,086,052 B2
(45) Date of Patent: Jul. 21, 2015

(54) ROTOR BLADE TRANSPORTATION SYSTEM

(75) Inventors: Vijaykumar Muppayya Hiremath, Bangalore (IN); Umesh B. Shingne, Bangalore (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/586,230

(22) Filed: Aug. 15, 2012

(65) Prior Publication Data
US 2014/0050547 A1    Feb. 20, 2014

(51) Int. Cl.
*B60P 7/08*    (2006.01)
*F03D 1/00*    (2006.01)
*B60P 7/12*    (2006.01)

(52) U.S. Cl.
CPC . *F03D 1/005* (2013.01); *B60P 7/12* (2013.01); *Y02E 10/72* (2013.01)

(58) Field of Classification Search
CPC ............ B60P 7/12; F03D 1/005; Y02E 10/72
USPC ............ 410/34, 44, 45, 53; 280/404; 414/460
See application file for complete search history.

(56) References Cited

U.S. PATENT DOCUMENTS

| | | | |
|---|---|---|---|
| 3,837,295 | A | 9/1974 | Fedele |
| 4,150,628 | A | 4/1979 | Keldenich |
| 6,286,435 | B1 | 9/2001 | Kassab et al. |
| 7,591,621 | B1 | 9/2009 | Landrum et al. |
| 8,056,203 | B2 * | 11/2011 | Madsen |
| 2009/0274529 | A1 | 11/2009 | Broderick et al. |

* cited by examiner

*Primary Examiner* — Stephen Gordon
(74) *Attorney, Agent, or Firm* — Dority & Manning, P.A.

(57) ABSTRACT

A transportation system is disclosed for transporting a rotor blade having a first end and a second end defining a rotor blade length. The transportation system includes a truck configured to transport the rotor blade, the truck including a bed having a forward end and a distal end defining a bed length. The transportation system further includes a first fixture configured on the bed, the first fixture comprising a generally arcuate guide member and a support frame slidable along the guide member, the support frame configured to support the rotor blade. The transportation system further includes a second fixture configured on the bed for one of slidable support or rotatable support of the rotor blade. Movement of at least one of the first fixture or the second fixture rotates the rotor blade within a plane defined by the bed.

17 Claims, 6 Drawing Sheets

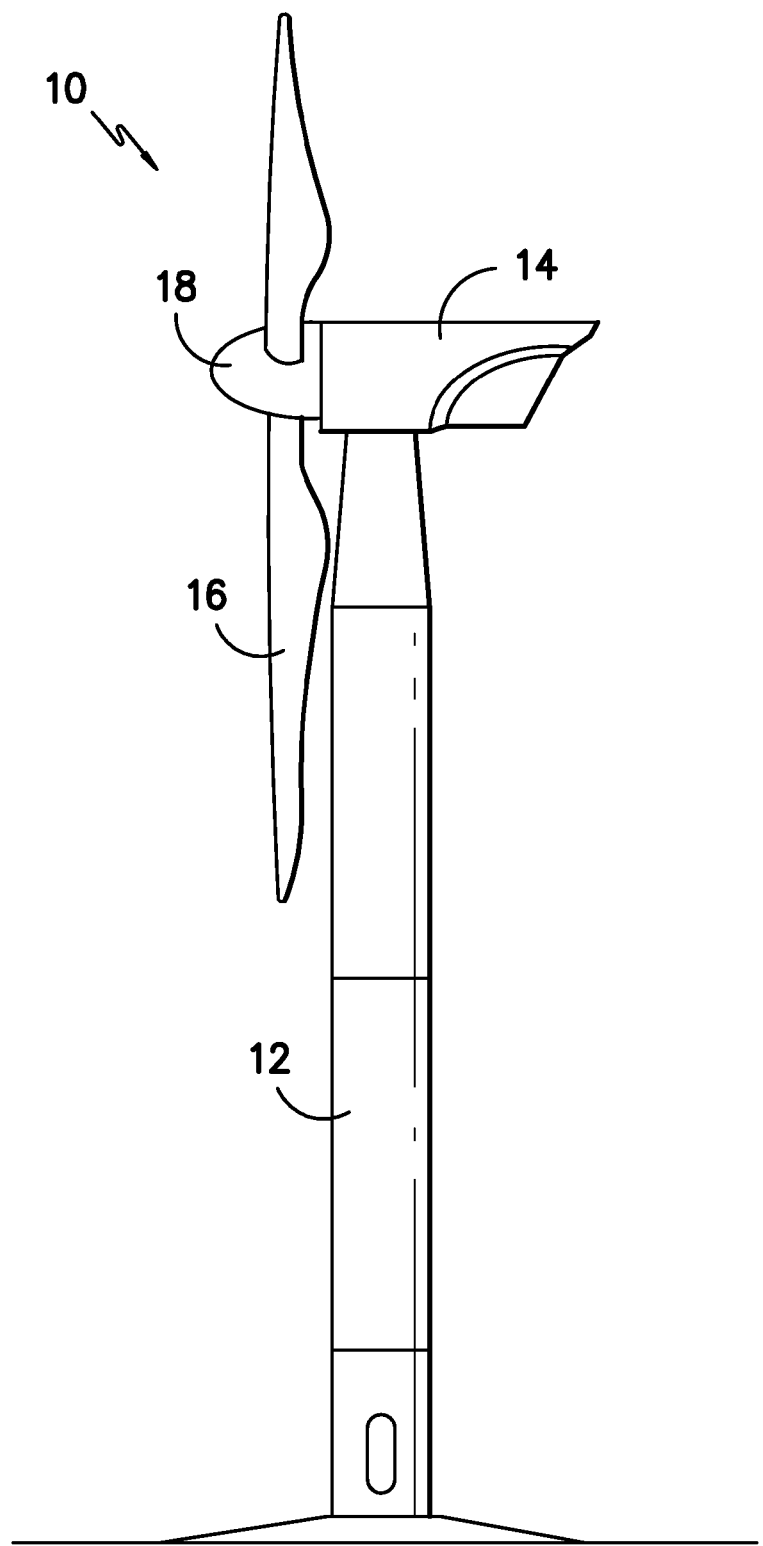
FIG. -1-
PRIOR ART

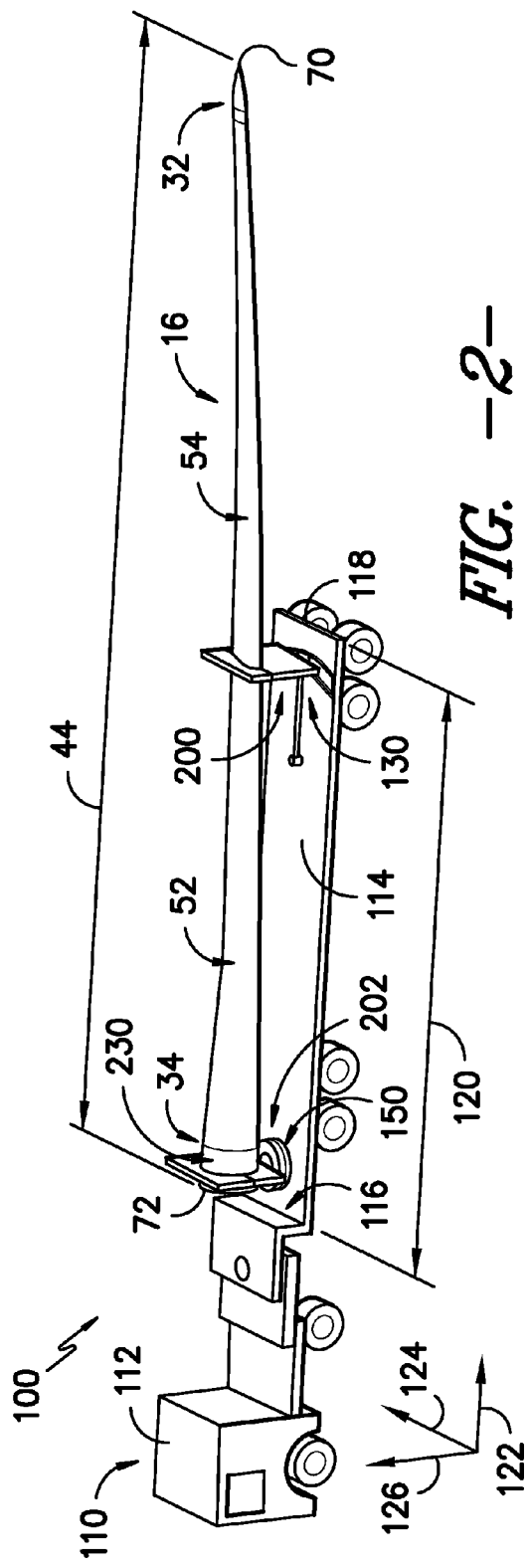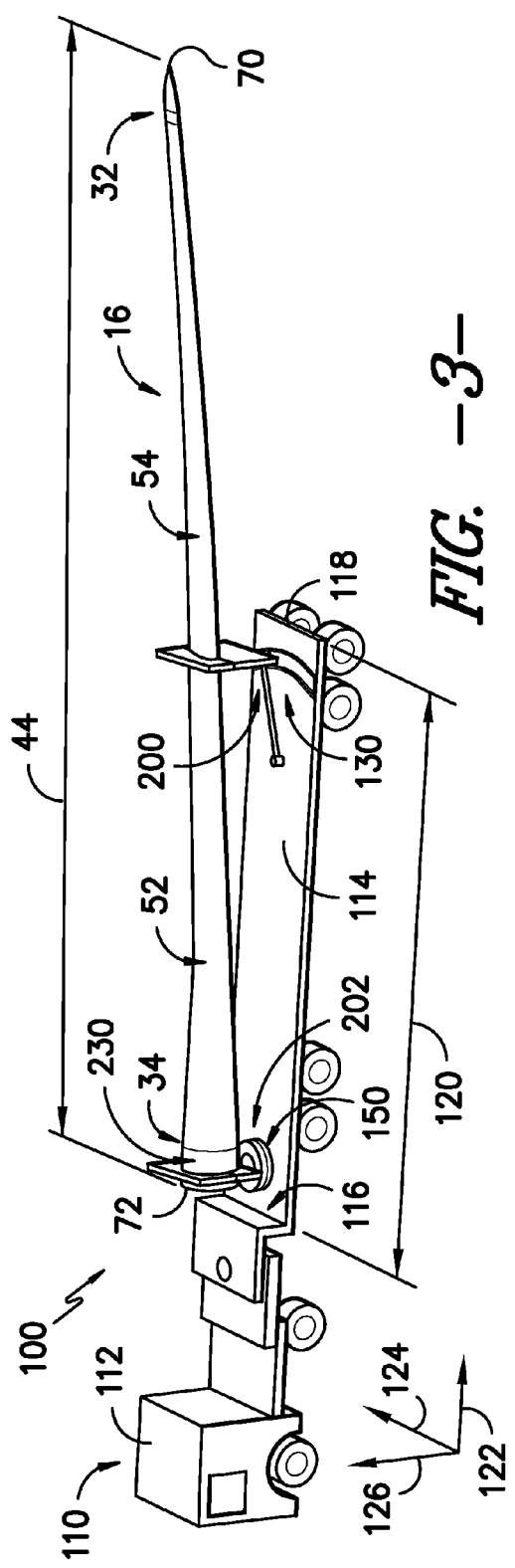

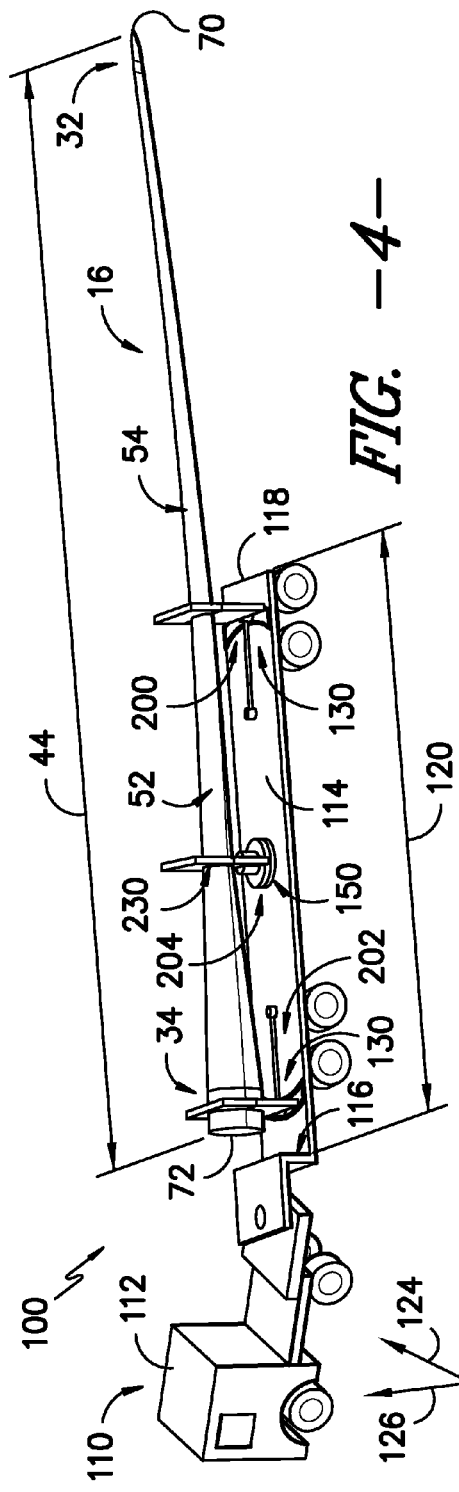
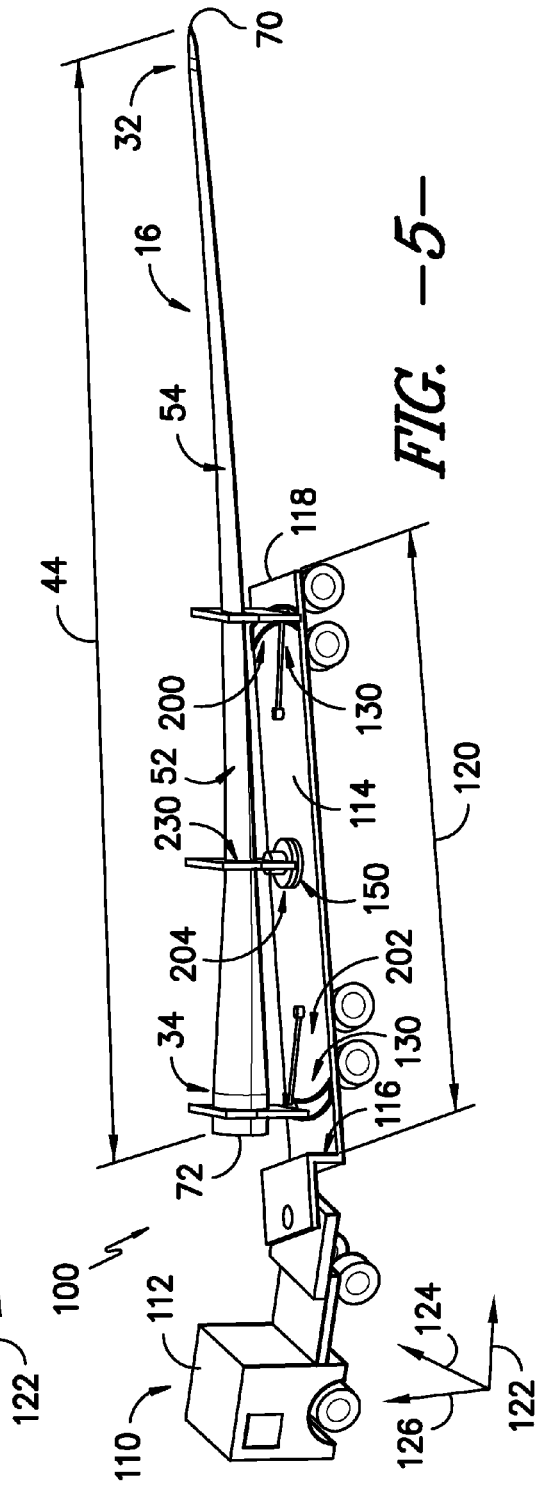

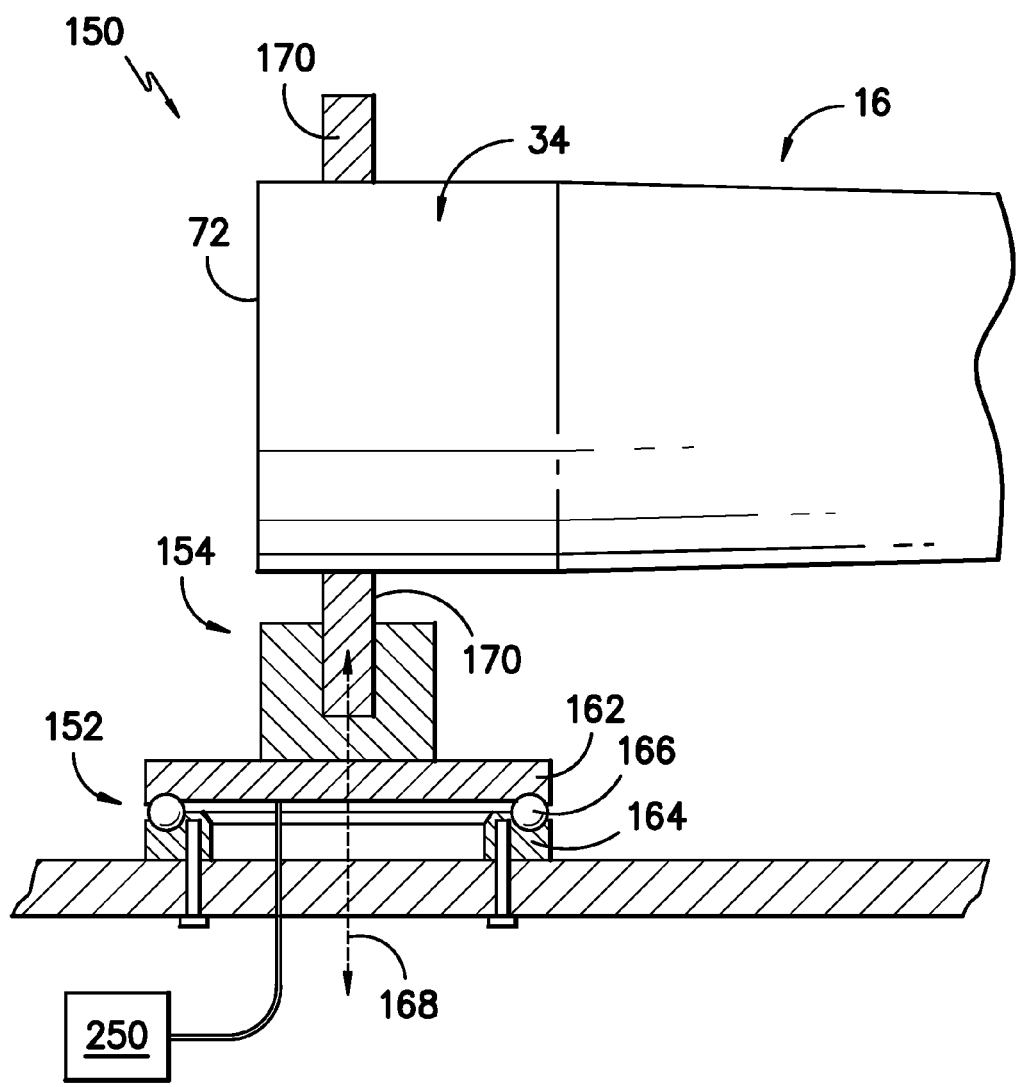
FIG. -6-

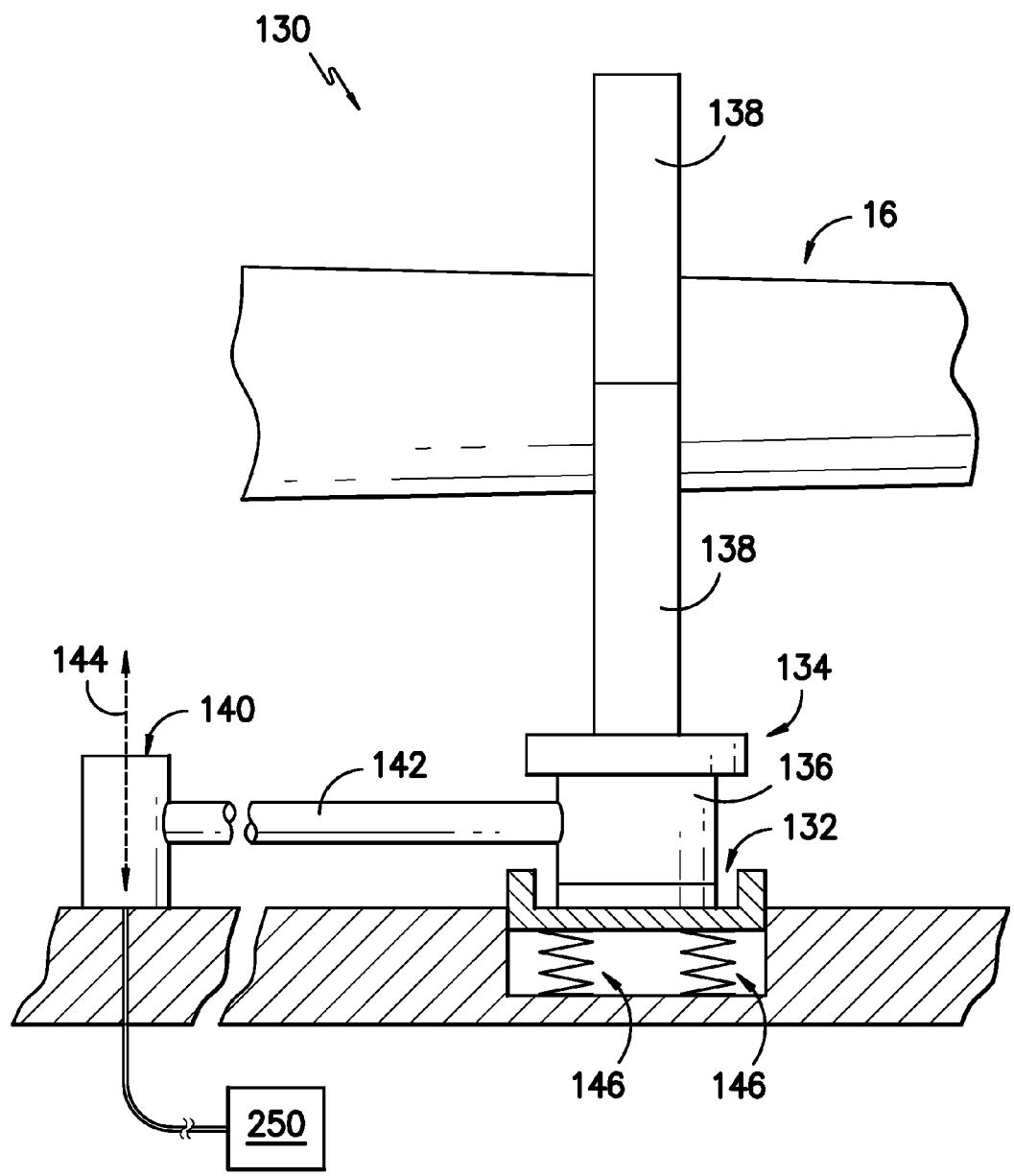
FIG. -7-

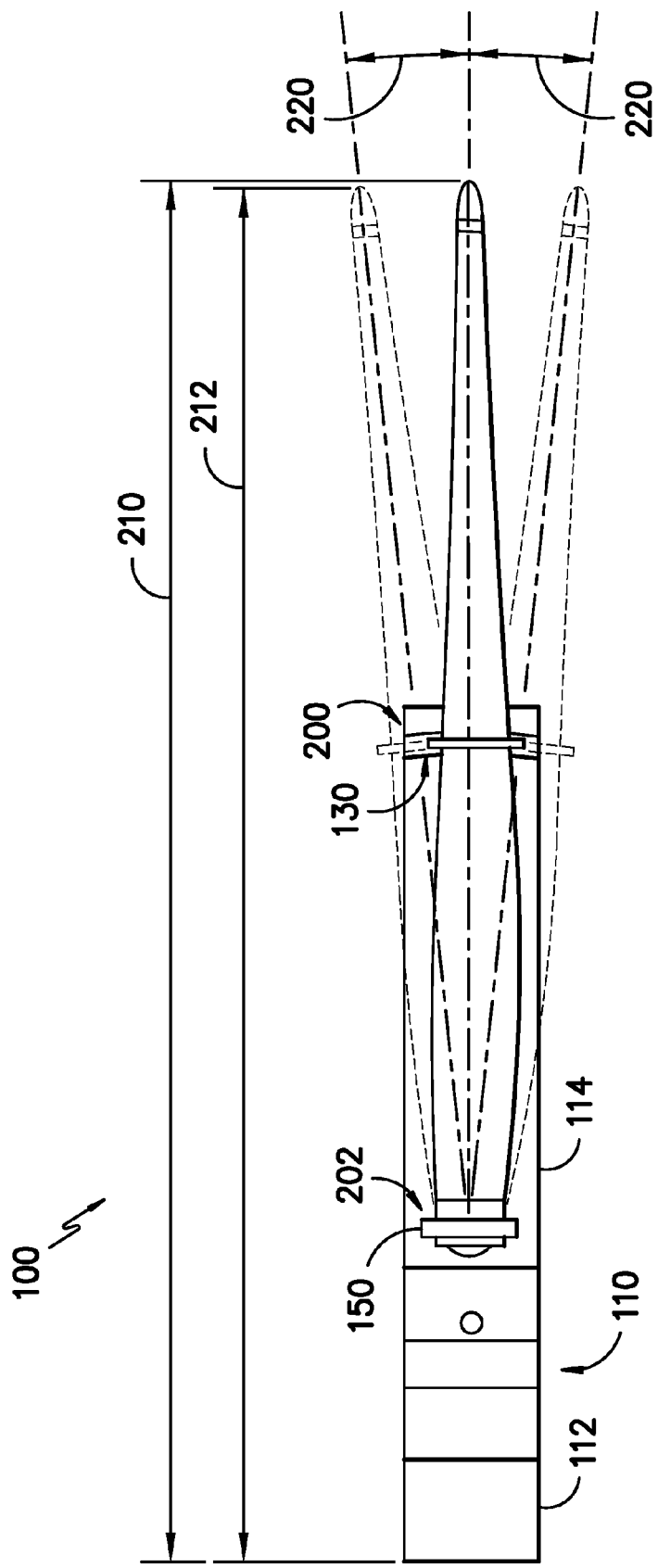

ROTOR BLADE TRANSPORTATION SYSTEM

FIELD OF THE INVENTION

The present disclosure relates in general to wind turbine rotor blades, and more particularly to systems for transporting rotor blades.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known foil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

The size, shape, and weight of rotor blades are factors that contribute to energy efficiencies of wind turbines. An increase in rotor blade size increases the energy production of a wind turbine, while a decrease in weight also furthers the efficiency of a wind turbine. Presently, large commercial wind turbines in existence and in development are capable of generating from about 1.5 to about 12.5 megawatts of power. These larger wind turbines may have rotor blade assemblies larger than 90 meters in diameter. Accordingly, efforts to increase rotor blade size, decrease rotor blade weight, and increase rotor blade strength, while also improving rotor blade aerodynamics, aid in the continuing growth of wind turbine technology and the adoption of wind energy as an alternative energy source.

As the size of wind turbines increase, particularly the size of rotor blades, so do the respective costs of manufacturing, transporting, and assembling the wind turbines. The economic benefits of increased wind turbine sizes must be weighed against these factors. For example, the costs of pre-forming, transporting, and erecting a wind turbine having rotor blades in the range of 90 meters may significantly impact the economic advantage of the larger wind turbine.

For example, the costs of transporting rotor blades increase as the size of the rotor blades increase. One known method for transporting rotor blades involves the use of large trucks, such as tractor-trailers. The rotor blades are loaded onto trailers, which are hauled by the trucks to a desired destination. Frequently, however, this transportation method is hindered by the existence of obstacles that restrict such transportation. For example, the roadways on which such trucks travel may include turns of varying sizes and shapes. Some such turns in the roads may, for example, require a truck to turn 180 degrees in a relatively short distance. Further, many roads pass by walls, bridges, hills, mountains, trees or other such obstacles that are situated relatively close to the road. Rotor blades having increasing lengths may overhang the trucks on which they are being transported. If a truck is required to turn in a location wherein such obstacles are close to the road, the rotor blades may thus be at risk of contacting the obstacles, resulting in damage to the rotor blades.

Known solutions to these transportation problems require, for example, removing the rotor blade from the truck while the truck is turning. These solutions can be expensive and time-consuming. For example, traffic on the road must be halted, and a crane or other lifting machinery must be utilized to lift the rotor blade from the truck. The truck must then be allowed to turn on the road. The rotor blade must then be replaced and secured on the truck. An alternative solution involves loading the rotor blades into, for example, boats or barges, or trains, rather than trucks, and transporting the rotor blades along waterways or railroads to a desired destination. This solution, however, is also expensive and time-consuming, and frequently the desired destination of a rotor blade does not have waterways or railroads leading to it. A further alternative solution involves separating the rotor blades into smaller separate rotor blade components for transport. However, separating a rotor blade may weaken the fibers and/or other reinforcing structures within the rotor blade, thus undesirably weakening the rotor blade.

Accordingly, improved systems for transporting rotor blades are desired in the art. In particular, transportation systems that are relatively efficient, fast, and cost-effective would be desired.

BRIEF DESCRIPTION OF THE INVENTION

Aspects and advantages of the invention will be set forth in part in the following description, or may be obvious from the description, or may be learned through practice of the invention.

In one embodiment, a transportation system is disclosed for transporting a rotor blade having a first end and a second end defining a rotor blade length. The transportation system includes a truck configured to transport the rotor blade, the truck including a bed having a forward end and a distal end defining a bed length. The transportation system further includes a first fixture configured on the bed, the first fixture comprising a generally arcuate guide member and a support frame slidable along the guide member, the support frame configured to support the rotor blade. The transportation system further includes a second fixture configured on the bed for one of slidable support or rotatable support of the rotor blade. Movement of at least one of the first fixture or the second fixture rotates the rotor blade within a plane defined by the bed.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a perspective view of a wind turbine according to one embodiment of the present disclosure;

FIG. 2 is a perspective view of a transportation system including a rotor blade in a first position according to one embodiment of the present disclosure;

FIG. 3 is a perspective view of the transportation system of FIG. 2 including the rotor blade in a second position according to one embodiment of the present disclosure;

FIG. 4 is a perspective view of a transportation system including a rotor blade in a first position according to another embodiment of the present disclosure;

FIG. 5 is a perspective view of the transportation system of FIG. 4 including the rotor blade in a second position according to another embodiment of the present disclosure;

FIG. 6 is a cross-sectional view of a rotational fixture according to one embodiment of the present disclosure;

FIG. 7 is a cross-sectional view of a slidable fixture according to one embodiment of the present disclosure; and, FIG. 8 is a top view of a transportation system illustrating various positions of the rotor blade according to one embodiment of the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 illustrates a wind turbine 10 of conventional construction. The wind turbine 10 includes a tower 12 with a nacelle 14 mounted thereon. A plurality of rotor blades 16 are mounted to a rotor hub 18, which is in turn connected to a main flange that turns a main rotor shaft. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration.

Referring to FIGS. 2 through 5 and 8, a rotor blade 16 according to the present disclosure may include exterior surfaces defining a pressure side and a suction side extending between a leading edge and a trailing edge, and may extend from a blade tip 32 to a blade root 34. The exterior surfaces may be generally aerodynamic surfaces having generally aerodynamic contours, as is generally known in the art.

In some embodiments, the rotor blade 16 may include a plurality of individual blade segments aligned in an end-to-end order from the blade tip 32 to the blade root 34. Each of the individual blade segments may be uniquely configured so that the plurality of blade segments define a complete rotor blade 16 having a designed aerodynamic profile, length, and other desired characteristics. For example, each of the blade segments may have an aerodynamic profile that corresponds to the aerodynamic profile of adjacent blade segments. Thus, the aerodynamic profiles of the blade segments may form a continuous aerodynamic profile of the rotor blade 16. Alternatively, the rotor blade 16 may be formed as a singular, unitary blade having the designed aerodynamic profile, length, and other desired characteristics.

The rotor blade 16 may, in exemplary embodiments, be curved. Curving of the rotor blade 16 may entail bending the rotor blade 16 in a generally flapwise direction and/or in a generally edgewise direction. The flapwise direction may generally be construed as the direction (or the opposite direction) in which the aerodynamic lift acts on the rotor blade 16. The edgewise direction is generally perpendicular to the flapwise direction. Flapwise curvature of the rotor blade 16 is also known as pre-bend, while edgewise curvature is also known as sweep. Thus, a curved rotor blade 16 may be pre-bent and/or swept. Curving may enable the rotor blade 16 to better withstand flapwise and edgewise loads during operation of the wind turbine 10, and may further provide clearance for the rotor blade 16 from the tower 12 during operation of the wind turbine 10.

The rotor blade 16 may further define a chord and a length or span 44. As shown, the chord may vary throughout the span 44 of the rotor blade 16. Thus, a local chord may be defined for the rotor blade 16 at any point on the rotor blade 16 along the span 44.

Additionally, the rotor blade 16 may define an inboard area 52 and an outboard area 54. The inboard area 52 may be a span-wise portion of the rotor blade 16 extending from the root 34. For example, the inboard area 52 may, in some embodiments, include approximately 33%, 40%, 50%, 60%, 67%, or any percentage or range of percentages therebetween, or any other suitable percentage or range of percentages, of the span 44 from the root 34. The outboard area 54 may be a span-wise portion of the rotor blade 16 extending from the tip 32, and may in some embodiments include the remaining portion of the rotor blade 16 between the inboard area 52 and the tip 32. Additionally or alternatively, the outboard area 54 may, in some embodiments, include approximately 33%, 40%, 50%, 60%, 67%, or any percentage or range of percentages therebetween, or any other suitable percentage or range of percentages, of the span 44 from the tip 32.

The rotor blade 16 of the present disclosure may require transportation from, for example, a manufacturing location to an operation location, such as a wind farm. Further, the rotor blade 16 may be impeded during transportation by obstacles such as walls, bridges, hills, mountains, trees, etc. For example, the rotor blade 16 may include a first end 70 and a second end 72. In some exemplary embodiments, the first end 70 may be adjacent the blade tip 32 and the second end 72 may be adjacent the blade root 34, or vice-versa. The length 44 of the rotor blade 16, which may extend from the first end 70 to the second end 72, may be of a size that impedes transport past these obstacles.

Thus, as shown in FIGS. 2 through 8, a transportation system 100 is disclosed for transporting a rotor blade 16. The transportation system 100 may include, for example, a truck 110 configured to transport the rotor blade 16. Any suitable truck 110 is within the scope and spirit of the present disclosure. For example, the truck 110 may generally have a cab 112 and a bed 114, such as a trailer. The bed 114 may be a separate component from the cab 112 that is hitched to the cab 112 for transportation, or the bed 114 and cab 112 may be attached. The bed may include a forward end 116 that is nearest to the cab 112 and a distal end 118 that is farthest from the cab 112. The bed 114 may be of suitable size, and include suitable components and accessories, for accommodating and transporting the rotor blade 16 disposed thereon. In some embodiments, the length of the rotor blade 16 may be greater than a length 120 of the bed 114 defined between the forward end 116 and distal end 118. Thus, the first end 70 or second end 72 may overhang the bend 114, as shown. Further, the bed 114 may define a horizontal plane. The horizontal plane may further be defined by as shown by x-axis 122 and a y-axis 124. A z-axis 126 may extend perpendicular to the x-axis 122 and y-axis 124 in a generally vertical direction. The transportation system 100 may allow the rotor blade 16 to be rotated within the plane, as shown and discussed below.

A transportation system 100 according to the present disclosure may further include various fixtures that support the rotor blade 16 and rotate the rotor blade 16 within the plane. In some embodiments, as shown in FIGS. 2 through 5 and 7 for example, one or more slidable fixtures 130 may be included. A slidable fixture 130 may include a guide member 132 and a support frame 134. The support frame 134 may be slidable along the guide member 132. In some embodiments, for example, as shown in FIGS. 2 through 5 and 7, the guide member 132 is a channel. Thus, for example, the support frame 134 may include a pin 136 that extends into the channel 132. The pin 136 may be slidable within the channel 132 through the length of the channel 132, thus sliding the support frame 134. The pin 136 may be rotatable or stationary with respect to the support frame 134 to facilitate sliding within the channel 132. In other embodiments, the guide member 132 may be, for example, a rail (not shown). The support frame 134 may include a grooved wheel or other suitable component (not shown) that extends around the rail. The component may be slidable along the rail through the length of the rail, thus sliding the support frame 134. The rail may be rotatable or stationary with respect to the support frame 134 to facilitate sliding along the rail. The guide member 132 may be generally arcuate, such that the support frame 134 slides in a generally arcuate path within the guide member 132. Further, the guide member 132 may be defined generally in or parallel to the plane defined by the bed 114, such that the support frame 134 slides within the plane.

The support frame 134 may further include suitable frame members 138 for contacting and securing the rotor blade 16. Such frame members 138 may thus, for example, have contours that correspond to the contours of the rotor blade 16, such that the rotor blade 16 and frame members 138 may generally fit together. Other suitable components of the support frame 134, such as padding, hinges, locking mechanisms, etc. (not shown), may further be included in the support frame 134 for supporting the rotor blade 16. It should be understood that any suitable support frame 134 having any suitable configuration for supporting a rotor blade 16 is within the scope and spirit of the present disclosure.

A slidable fixture 130 may further include an actuator 140. The actuator 140 may be operable to slide the support frame 134 along the guide member 132, such as between a first position as shown in FIGS. 2 and 4 and a second position as shown in FIGS. 3 and 5. The actuator 140 may be or include a motor, gear drive mechanism, a pneumatic cylinder or device, a hydraulic cylinder or device, or any other suitable actuatable device. In some embodiments, the actuator 140 may be, for example, directly coupled to the support frame 134, such as to the pin 136 thereof. In other embodiments, as shown in FIGS. 2 through 5, an arm 142 may couple the actuator 140 and support frame 134. In these embodiments, the arm 142 may rotate about a pivot point 144, at which the actuator 140 may be located and/or the actuator 140 and arm 142 coupled. The arm 142 may be coupled to the support frame 134, such as to the pin 136, at an end of the arm 142 opposite the pivot point 144. Rotation of the arm 142 may thus cause the support frame 134 to slide along the guide member 132.

A slidable fixture 130 according to the present disclosure may be configured on the bed 114 of a truck 110. In some embodiments, for example, guide member 132 may be included in the bed 114. In other embodiments, the guide member 132 may be formed separately from the bed 114 and mounted thereon through the use of suitable mechanical fasteners (nut-bolt combinations, rivets, screws, nails, etc.), welding, etc. The support frame 134 may be mounted to the guide member 132 as discussed above. Further, in some embodiments, as shown in FIG. 7, a slidable fixture 130 may include one or more damping elements 146. The damping elements 146 may be disposed between the guide member 132 and the bed 114, and may reduce vibrations and other disruptions from being transmitted from the bed 114 to the slidable fixture. Damping elements 146 according to the present disclosure may be springs as shown, pads formed from rubber or other suitable materials, or any other suitable devices that may provide damping characteristics.

In some embodiments, as shown in FIGS. 2 through 6 for example, one or more rotatable fixtures 150 may be included in a transportation system 100 according to the present disclosure. A rotatable fixture 150 may include a bearing 152 and a support frame 154. The bearing 152 in some embodiments may include, for example, an inner race 162 and an outer race 164. A plurality of bearing elements 166, such as balls or other suitable elements, therebetween. The inner race 162 may rotate with respect to outer race 164, or vice versa. Alternatively, any suitable bearing 152 may be utilized in accordance with the present disclosure. For example, suitable bearings 152 for use in a rotatable fixture 150 according to the present disclosure include roller bearings, pneumatic bearings, hydrodynamic bearings, hydrostatic bearings, etc.

The support frame 154 of a rotatable fixture 150 according to the present disclosure is rotatable about the bearing 152, such as about a central axis 168 defined by the bearing 152. For example, the support frame 154 may be mounted to the bearing 152 or a portion thereof, such as through the use of suitable mechanical fasteners (nut-bolt combinations, rivets, screws, nails, etc.), welding, etc. In embodiments wherein the bearing 152 includes an inner race 162 and outer race 164, the support frame 154 may, for example, be mounted to the one of the inner race 162 or outer race 164 that rotates relative to the other. Thus, when the bearing 152 rotates, the support frame 154 similarly rotates. In exemplary embodiments, the support frame 154 is mounted to the bearing 152 at the central axis 168, such that movement of the support frame 154 is generally purely rotational about this axis 168. The rotatable fixture 150 may thus rotate between a first position, as shown in FIGS. 2 and 4, and a second position, as shown in FIGS. 3 and 5.

A rotatable fixture 150 may further include an actuator (not shown). The actuator may be operable to rotate the bearing 152, such as between a first position as shown in FIGS. 2 and 4 and a second position as shown in FIGS. 3 and 5. The actuator may be or include a motor, gear drive mechanism, a pneumatic cylinder or device, a hydraulic cylinder or device, or any other suitable actuatable device. In some embodiments, the actuator may be, for example, directly coupled to the inner race 162 or outer race 164.

The support frame 154 may further include suitable frame members 170 for contacting and securing the rotor blade 16. Such frame members 170 may thus, for example, have contours that correspond to the contours of the rotor blade 16, such that the rotor blade 16 and frame members 170 may generally fit together. Other suitable components of the support frame 154, such as padding, hinges, locking mechanisms, etc. (not shown), may further be included in the support frame 154 for supporting the rotor blade 16. It should be understood that any suitable support frame 154 having any suitable configuration for supporting a rotor blade 16 is within the scope and spirit of the present disclosure.

A rotatable fixture 150 according to the present disclosure may be configured on the bed 114 of a truck 110. In some embodiments, for example, bearing 152 or any portion thereof may be included in the bed 114. In other embodiments, the bearing 152 or any portion thereof, such as the inner race 162 or outer race 164, may be formed separately from the bed 114 and mounted thereon through the use of suitable mechanical fasteners (nut-bolt combinations, rivets, screws, nails, etc.), welding, etc.

As discussed, a transportation system 100 according to the present disclosure thus includes a truck 110 and a plurality of fixtures configured on a bed 114 of the truck 110, which may be slidable fixtures 130 and/or rotatable fixtures 150. The movement of one or more of the fixtures may rotate the rotor blade 16 within the plane defined by the bed 114.

Thus, in some embodiments, a transportation system 100 includes a first fixture 200 and a second fixture 202. Each of these fixtures 200, 202 provides either slidable support or rotational support of the rotor blade 16. In exemplary embodiments, the first fixture 200 is a slidable fixture 130 and the second fixture 202 is a rotatable fixture 150, as shown in FIGS. 2 and 3. Alternatively, both the first fixture 200 and the second fixture 202 may be slidable fixtures 130, as shown in FIGS. 4 and 5.

In some embodiments, the first fixture 200 may be disposed proximate the distal end 118 of the bed 114 and/or the second fixture 202 may be disposed proximate the forward end 116 of the bed 114, as shown. Alternatively, however, the first fixture 200 and/or second fixture 202 may be disposed at any suitable location on the bed 114 between the forward end 116 and distal end 118.

In some embodiments, the second fixture 202 may be configured to support the root 34 of the rotor blade 16. Thus, the support frame of this fixture 202 may have a suitable shape, size, and components to support the root 34. Alternatively, the second fixture 202 may be configured to support any suitable portion of the rotor blade 16 at any suitable inboard area 52 location or outboard area location 54. The first fixture 200 may further be configured to support any suitable portion of the rotor blade 16 at any suitable inboard area 52 location or outboard area location 54.

In some embodiments, a transportation system 100 may further include a third fixture 204, which may further provide either slidable support or rotational support of the rotor blade 16. The third fixture 204 may thus be a rotatable fixture 150, as shown in FIGS. 4 and 5, or a slidable fixture 130. The third fixture 204 may be disposed between the first fixture 200 and the second fixture 202, and may be configured to support any suitable portion of the rotor blade 16 at any suitable inboard area 52 location or outboard area location 54.

As discussed, movement of the various fixtures rotates the rotor blade 16 within the plane defined by the bed 114. For example, FIGS. 2 and 4 illustrate the rotor blade 16 and various fixtures in a first position, and FIGS. 3 and 5 illustrate the rotor blade 16 and various fixtures in a second position wherein the rotor blade 16 has been rotated in the plane relative to the first position. Rotation of the rotor blade 16 according to the present disclosure shortens an overall length of the combined rotor blade 16 and transportation system 100, thus allowing for more efficient, fast, and cost-effective transportation of the rotor blade 16, particularly in environments involving turns and obstacles, as discussed above. As shown in FIG. 8, for example, an overall length 210 in the first position is greater than an overall length 212 in any suitable second position.

As further shown in FIG. 8, the various fixtures as discussed herein may move suitable amounts to allow the rotor blade 16 to rotate within any suitable angle 220 range relative to the first position and within the plane defined by the bed 114. Such angle 220 may in some embodiments be between approximately 0 degrees and approximately 45 degrees, approximately 0 degrees and approximately 30 degrees, approximately 0 degrees and approximately 20 degrees, approximately 0 degrees and approximately 15 degrees, or approximately 0 degrees and approximately 10 degrees, in either direction within the plane from the first position.

In some embodiments, rotation of the rotor blade 16 may be in a particular direction based on the directed that the truck 110 is turning. For example, the system 100 may rotate the rotor blade 16 to the left when the truck 110 is turning to the left, and may rotate the rotor blade 16 to the right when the truck 110 is turning to the right (the terms "left" and "right" are utilized in the conventional sense and based on the view of an operator of a truck 110 when driving the truck 110). Additionally or alternatively, the system 100 may rotate the rotor blade 16 to the left when the truck 110 is turning to the right, and may rotate the rotor blade 16 to the right when the truck 110 is turning to the left.

Rotation of the rotor blade 16 may be about any suitable pivot point 230. In some embodiments, as shown in FIGS. 2 and 3, the pivot point 230 may be located at the root 34. In other embodiments, as shown in FIGS. 4 and 5, the pivot point 230 may be located at the center of gravity of the rotor blade 230. In these embodiments, the center of gravity may thus remain stationary during rotation of the rotor blade 16. Thus, the first fixture 200 and second fixture 202, as well as the optional third fixture 204, may be positioned along the span 44 such that the center of gravity remains stationary. Further, in some embodiments, one of the fixtures, such as the third fixture 204 as shown in FIGS. 4 and 5, the second fixture 202 as shown in FIGS. 2 and 3, or the first fixture 200, may be positioned at the pivot point 230, such as in some embodiments at the center of gravity.

As discussed, the various fixtures of a transportation system 100 according to the present disclosure move, which rotates a rotor blade 16 supported thereon. In some embodiments, a transportation system 100 may further include a controller 250. The controller 250 may be operable to move any one or more of the first fixture 200, second fixture 202, and/or third fixture 204. Further, in some embodiments, the controller 250 may be operable to control the damping elements 146, such as to increase or decrease the stiffness thereof. Thus, the controller 250 may be in communication, either wirelessly or through a wired connection, with one or more of these fixtures 200, 202, 204 and/or damping elements 146. The controller 250 may include one or more processor(s) and associated memory device(s) configured to perform a variety of computer-implemented functions (e.g., performing required methods, steps, calculations, etc.). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) may generally be configured to store suitable computer-readable instructions that, when implemented by the processor(s), configure the controller 250 to perform various functions.

In some embodiments, the controller 250 and/or various actuators required for the fixtures 200, 202, 204 and/or damping elements 146 may be operably connected to the truck 110. For example, the truck 110 may have various pneumatic or hydraulic systems, such as, for example, braking systems, and may further include various controllers for operating these systems. The controller 250 and/or various actuators, such as the pneumatic or hydraulic cylinder, of the present disclosure may be operably connected to one or more of these systems and/or controllers. Thus, the fixtures 200, 202, 204 and/or damping elements 146 may be, for example, more efficiently utilized and controlled by, for example, the operator of the truck 110.

It should be understood that movement of any one or more of the fixtures as discussed herein may rotate the rotor blade 16. For example, in exemplary embodiments, movement of both a first fixture 200 and a second fixture 202, as well as an optional third fixture 204, may rotate the rotor blade 16. In other embodiments, movement of only one fixture 200, 202, or 204 may rotate the rotor blade 16. For example, movement of one fixture may rotate a portion of the rotor blade 16 within the acceptable bending limits of that portion of the rotor blade 16, while the remaining portion of the rotor blade 16 remains stationary due to non-movement of another fixture. In some embodiments, for example, an outboard area 54 may be rotated due to movement of a first fixture 200 while an inboard area 52 and second fixture remain stationary, or vice versa.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A transportation system for transporting a rotor blade having a first end and a second end defining a rotor blade length, the transportation system comprising:
    a truck configured to transport the rotor blade, the truck including a bed having a forward end and a distal end defining a bed length;
    a first fixture configured on the bed, the first fixture comprising a generally arcuate guide member and a support frame slidable along the guide member, the support frame configured to support the rotor blade, the fixture further comprising a damping element disposed between the guide member and the bed;
    a second fixture configured on the bed for one of slidable support or rotatable support of the rotor blade,
    wherein movement of at least one of the first fixture or the second fixture rotates the rotor blade within a plane defined by the bed.

2. The transportation system of claim 1, wherein the second fixture comprises generally arcuate guide member and a support frame slidable along the guide member, the support frame configured to support the rotor blade.

3. The transportation system of claim 1, wherein the second fixture comprises a bearing and a support frame rotatable about the bearing, the support frame configured to support the rotor blade.

4. The transportation system of claim 3, wherein the bearing comprises an inner race, an outer race, and a plurality of bearing elements therebetween.

5. The transportation system of claim 1, wherein the guide member is a channel.

6. The transportation system of claim 1, wherein the first fixture is disposed proximate the distal end of the bed.

7. The transportation system of claim 1, wherein the second fixture is configured to support a root of the rotor blade.

8. The transportation system of claim 1, further comprising a controller operable to move the first fixture and the second fixture.

9. The transportation system of claim 1, further comprising a third fixture configured on the bed for one of slidable support or rotatable support of the rotor blade, the third fixture disposed between the first fixture and the second fixture.

10. The transportation system of claim 1, wherein the first fixture and the second fixture are positioned such that a center of gravity of the rotor blade remains generally stationary during rotation of the rotor blade.

11. A transportation system for transporting a rotor blade having a first end and a second end defining a rotor blade length, the transportation system comprising:
    a truck configured to transport the rotor blade, the truck including a bed having a forward end and a distal end defining a bed length;
    a first fixture configured on the bed proximate the distal end, the first fixture comprising a generally arcuate guide member and a support frame slidable along the guide member, the support frame configured to support the rotor blade, the first further comprising a damping element disposed between the guide member and the bed;
    a second fixture configured on the bed proximate the forward end, the second fixture comprising a bearing and a support frame rotatable about the bearing, the support frame configured to support the rotor blade;
    wherein movement of at least one of the first fixture or the second fixture rotates the rotor blade within a plane defined by the bed.

12. The transportation system of claim 11, wherein the bearing comprises an inner race, an outer race, and a plurality of bearing elements there between.

13. A transportation system for transporting a rotor blade having a first end and a second end defining a rotor blade length, the transportation system comprising:
    a truck configured to transport the rotor blade, the truck including a bed having a forward end and a distal end defining a bed length;
    a first fixture configured on the bed proximate the distal end, the first fixture comprising a generally arcuate guide member and a support frame slidable along the guide member, the support frame configured to support the rotor blade, the first fixture comprising a damping element disposed between the guide member and the bed;
    a second fixture configured on the bed proximate the forward end, the second fixture comprising a generally arcuate guide member and a support frame slidable along the guide member, the support frame configured to support the rotor blade;
    wherein movement of at least one of the first fixture or the second fixture rotates the rotor blade within a plane defined by the bed.

14. The transportation system of claim 13, further comprising a third fixture configured on the bed for one of slidable support or rotatable support of the rotor blade, the third fixture disposed between the first fixture and the second fixture.

15. The transportation system of claim 14, wherein the third fixture comprises a bearing and a support frame rotatable about the bearing, the support frame configured to support the rotor blade.

16. The transportation system of claim 14, wherein the third fixture is positioned at a center of gravity of the rotor blade.

17. The transportation system of claim 13, wherein the first fixture and the second fixture are positioned such that a center of gravity of the rotor blade remains generally stationary during rotation of the rotor blade.

* * * * *